US006836740B2

United States Patent
Köhler et al.

(10) Patent No.: US 6,836,740 B2
(45) Date of Patent: Dec. 28, 2004

(54) METHOD FOR DETERMINING THE RELATIVE POSITION OF FIRST AND SECOND IMAGING DEVICES, METHOD OF CORRECTING A POSITION OF A POINT OF PROJECTION OF THE DEVICES, PRINTING FORM EXPOSER, PRINTING UNIT, PRINTING UNIT GROUP AND PRINTING PRESS

(75) Inventors: Thomas Köhler, Hartenstein (DE); Bernhard Zintzen, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/356,786

(22) Filed: Jan. 31, 2003

(65) Prior Publication Data

US 2003/0144815 A1 Jul. 31, 2003

Related U.S. Application Data

(60) Provisional application No. 60/359,933, filed on Feb. 27, 2002.

(30) Foreign Application Priority Data

Jan. 31, 2002 (DE) .......................................... 102 03 694

(51) Int. Cl.[7] .............................................. G01C 17/38
(52) U.S. Cl. ........................................ 702/94; 101/483
(58) Field of Search ......................... 702/94, 150, 159; 101/483; 430/311; 29/402.18; 235/462.1; 351/211; 355/67; 382/104, 148, 154; 600/417, 443

(56) References Cited

U.S. PATENT DOCUMENTS 5,832,415 A    11/1998  Wilkening et al.
2003/0101887 A1 *  6/2003  Wiedemann ................ 101/483

FOREIGN PATENT DOCUMENTS

DE    44 37 284 A1    4/1996
JP    10044370 A  *  2/1998   ........... B41F/15/08

* cited by examiner

*Primary Examiner*—John Barlow
*Assistant Examiner*—Xiuqin Sun
(74) *Attorney, Agent, or Firm*—Laurence A. Greenberg; Werner H. Stemer; Ralph E. Locher

(57) ABSTRACT

A method of determining a relative position of first and second imaging devices includes setting an image of a group of mutually different reference patterns and a basic pattern on an imaging medium, with the second imaging device. Each reference pattern of the group is assigned uniquely to one relative position. An image of at least one test pattern is set over the basic pattern by the first imaging device, for forming a combination pattern. A reference pattern having an area coverage coinciding with an area coverage of the combination pattern is identified from the group of reference patterns. A relative position associated with the identified reference pattern of the group of reference patterns is then identified. A printing form exposer, a printing unit, a printing unit group and a printing press for performing the method are also provided.

23 Claims, 5 Drawing Sheets

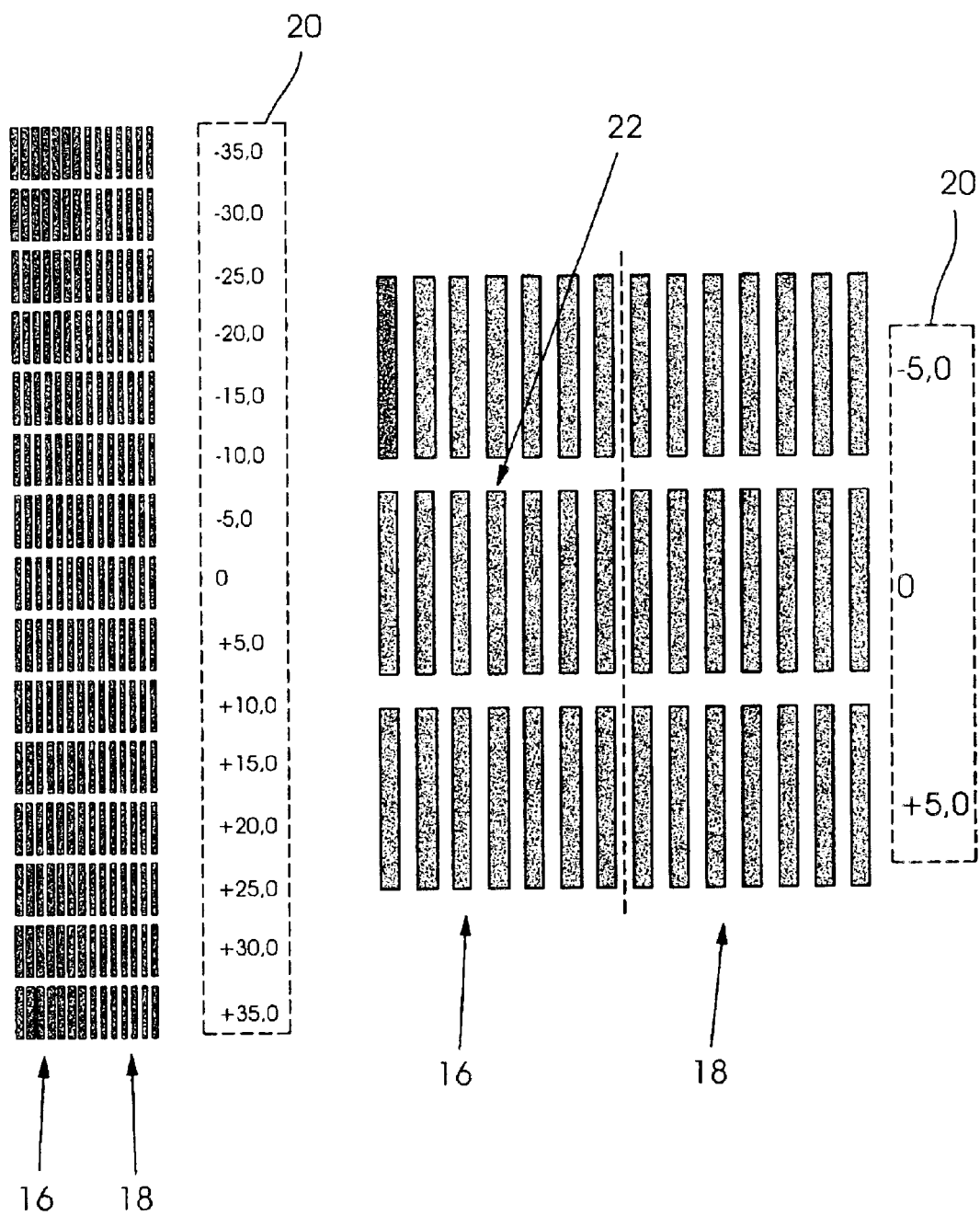

METHOD FOR DETERMINING THE RELATIVE POSITION OF FIRST AND SECOND IMAGING DEVICES, METHOD OF CORRECTING A POSITION OF A POINT OF PROJECTION OF THE DEVICES, PRINTING FORM EXPOSER, PRINTING UNIT, PRINTING UNIT GROUP AND PRINTING PRESS

CROSS-REFERENCE TO RELATED APPLICATION

This application claims the benefit under 35 U.S.C. §119 (e) of copending provisional application No. 60/359,933, filed Feb. 27, 2002.

BACKGROUND OF THE INVENTION

Field of the Invention

The invention relates to a method of determining the relative position of a first imaging or imagesetting device with respect to a second imaging or imagesetting device by setting images on an imaging medium assigned thereto. The invention further relates to a method of correcting the position of a point of projection of a first imaging device with respect to a point of projection of a second imaging device by changing the relative position of the point of projection of the first imaging device with respect to the point of projection of the second imaging device from an actual position to a nominal or reference position, in particular, in a printing form exposer or in a printing unit of a printing press.

In order to set an image on a two-dimensional surface of an imaging medium with the aid of one or more imaging devices, the surface is scanned, in two linearly independent coordinate directions for covering the area thereby, by providing a relative movement between the surface and the imaging device or devices, which is produced by a suitable actuator mechanism. The scanning is typically performed in a so-called fast scanning direction and a so-called slow scanning direction, so that all the points to be imaged on the surface are swept over by the imaging devices, more precisely by a number of imaging beams. In this regard, an imaging beam may be a light beam, in particular a laser light beam, whether in the infrared, visible or ultraviolet spectral ranges, a heat pulse, a gas jet or a droplet of a chemical substance or the like. An imaging device, also referred to as an imaging or imagesetting module, may have one or more imaging beams. In this regard, imaging media include printing forms, printing plates, so-called printing form precursors, films or the like. For setting images on imaging media in the graphics industry, whether at the pre-printing stage in printing form exposers or in the printing stage in printing units (on-press imaging or direct imaging printing units), laser light sources, in particular, are especially widespread in imaging devices. Frequently, laser light sources are diode lasers or solid body lasers, such as lasers with reinforcing media of Ti:sapphire or Nd:YLF, preferably pumped by a diode laser. Several laser light sources may be located on one or more assembled diode laser bars in one imaging device.

An imaging device may include one imaging channel or a group of imaging channels. Several imaging devices may be integrated into a block. For the purpose of imaging or inscribing, the imaging channels are switched on and off (timed releasing). Depending upon the imaging method that is selected, while at least one imaging channel is switched on, a relative movement may or may not take place between the point of projection and the imaging medium. By the use of an imaging medium whereon an image has been set or written, an image can be transferred to a printing material. Typical printing materials are paper, pasteboard or cardboard, organic polymer films or the like, whether they are in sheet or web form.

If a number of imaging devices are used, whether in a printing form exposer or exposing device, or in a printing unit, it is very important that the relative positions of the imaging devices with respect to one another and, assuming that a plurality of imaging beams emanate from one imaging device, that the imaging beams from the imaging device are aligned with one another. If appropriately accurate imaging optics is used on the imaging medium, it is consequently then possible for the relative position of the imaging beams on the imaging medium to be set up or calibrated with great precision relative to one another. As a result, without restricting the general number of imaging beams in an imaging device, merely for simplifying the drawings and description, it is assumed that each imaging device has one imaging beam, respectively. Furthermore, without restricting the general number of the imaging devices, likewise for simplifying the drawings, the description hereinbelow is directed to a first and a second imaging device, with the knowledge that more than two imaging devices may be involved.

The procedure for setting up or calibrating the relative position of a first imaging device with respect to a second imaging device (of a first with respect to a second imaging channel or of a first group of imaging channels with respect to a second group of imaging channels) can be required firstly in the assembly of the imaging devices and secondly in the event of maintenance of the apparatus or the press with which the imaging devices are associated, be it in a workshop or at the customer. According to a widespread procedure, therefore, a considerable amount of effort is associated in particular with the installation of printing presses with on-press imaging printing units. For each printing unit, test imaging of a printing form (imaging medium) is carried out, part of the printing form with an image set on it is cut out and the part is examined by a reader, so that correction values for the relative position can be determined. The correction values are used for making changes in the relative position, for example, this information is made available to the control system, and the imaging devices are adjusted with respect to one another. The aforedescribed method for determining the relative position is iterated until the desired or required precision has been reached. The relative position deviation can be determined both for the fast scanning direction and for the slow scanning direction, and the relative position can consequently be adjusted. However, the high outlay for material and of time is a disadvantage when this method is used.

For example, the published Non-prosecuted German Patent Application DE 44 37 284 A1, corresponding to U.S. Pat. No. 5,832,415, discloses that a calibration of a control system for the deflection of a laser beam can be performed as follows. A light-sensitive medium is irradiated by the laser beam in order to produce a test image and, therefrom, digitized image sections which are recorded by a CNC-controlled camera are then generated. A calculation of correction data for the control system for the diffraction or deflection of the laser beam is performed based upon a comparison between the actual positions of the laser beam, which are measured by recording the image sections, and predefined intended positions. The disadvantage when this method is employed is likewise the outlay for material and is in addition the requirement for using a precise CNC control system for the camera, which is also consequently quite expensive.

German Published, Non-prosecuted Patent Application DE 197 32 668 A1 discloses a calibration device for a beam scanning device, which has a surface with defined markings. With a detector device, the light reflected from the surface or transmitted light from the beam scanning the surface is registered. When the beam strikes a marking, only a low intensity is reflected and transmitted, respectively. From the registered variation in intensity of the radiation in reflection or transmission, the actual position of the laser beam is determined and, in a control system, is compared with the nominal or desired position anticipated for this location. From this comparison, a correction value can be determined and made available to the control system, for example stored as a tabular entry in a memory. A disadvantage of this calibration device is that a surface with precise markings must be made available. However, such a surface is sensitive and furthermore is little suited to be moved to various locations or to be accommodated in different machines, frequently with changes in shape, which may possibly lead to distortions of the coordinate system.

SUMMARY OF THE INVENTION

It is accordingly an object of the invention to provide a method for determining the relative position of first and second imaging devices, a method of correcting a position of a point of projection of the devices, a printing form exposer, a printing unit, a printing unit group and a printing press, which overcome the hereinafore-mentioned disadvantages of the heretofore-known methods and devices of this general type and with which it is possible, in a relatively simple manner, to detect a disadjustment of the imaging devices with respect to one another, i.e., a deviation between an actual distance and a nominal or desired distance.

With the foregoing and other objects in view, there is provided, in accordance with the invention, a method of determining a relative position of a first imaging device with respect to a second imaging device by setting images on an associated imaging medium. The method comprises, setting an image of a group of mutually different reference patterns and a basic pattern on the imaging medium, through the use of the second imaging device. Each reference pattern from the group thereof is assigned uniquely to one relative position. The first imaging device sets an image of at least one test pattern over the basic pattern, for forming a combination pattern. A reference pattern having an area coverage coinciding with the area coverage of the combination pattern is identified from the group of reference patterns. A relative position associated with the identified reference pattern of the group of reference patterns is identified.

In accordance with another mode of the invention, the method of determining the relative position of a first imaging device with respect to a second imaging device further includes providing that the reference patterns of the group thereof, the basic pattern and the test pattern are two-dimensional and uniform in one of two linearly independent directions.

In accordance with a further mode of the invention, the method of determining the relative position of a first imaging device with respect to a second imaging device further includes providing that the basic pattern is formed of a group of mutually identical control patterns.

In accordance with an added mode of the invention, the method of determining the relative position of a first imaging device with respect to a second imaging device further includes providing that the number of reference patterns in the group thereof and the number of control patterns is the same. A respective control pattern is assigned uniquely to a respective reference pattern in the group of reference patterns.

In accordance with an additional mode of the invention, the method of determining the relative position of a first imaging device with respect to a second imaging device further includes arranging the mutually associated reference patterns in the group thereof and control patterns adjacently on a surface of the imaging medium.

In accordance with yet another mode of the invention, the method of determining the relative position of a first imaging device with respect to a second imaging device further includes providing that the number of reference patterns in the group thereof is uneven. Furthermore, the test pattern covers a first part of the control patterns with a first sub-pattern, and a second part of the control patterns with a second sub-pattern. Both the first sub-pattern and the second sub-pattern cover a control pattern.

In accordance with yet a further mode of the invention, the method of determining the relative position of a first imaging device with respect to a second imaging device further includes providing that the reference patterns from the group thereof, the control patterns and the test pattern are two-dimensional, and uniform in one of two linearly independent directions.

In accordance with yet an added mode of the invention, the method of determining the relative position of a first imaging device with respect to a second imaging device further includes providing that the basic pattern has 50% area coverage.

In accordance with yet an additional mode of the invention, the method of determining the relative position of a first imaging device with respect to a second imaging device further includes providing that the basic pattern has a regular sequence of a plurality of exposed points and a like number of unexposed points in one direction of extent thereof.

In accordance with still another mode of the invention, the method of determining the relative position of a first imaging device with respect to a second imaging device further includes providing that each of the reference patterns in the group of reference patterns has a regular sequence of exposed and unexposed points in one direction of extent thereof. The sequences in one period respectively have a first and a second number of exposed points and a third and a fourth number of unexposed points.

In accordance with still a further mode of the invention, the method of determining the relative position of a first imaging device with respect to a second imaging device further includes providing that the directions of extent of the reference patterns in the group of reference patterns are parallel to one another.

In accordance with still an added mode of the invention, the method of determining the relative position of a first imaging device with respect to a second imaging device further includes providing that the number of reference patterns in the group of mutually different reference patterns is uneven, and assigning a reference pattern to a relative nominal or desired position. This includes assigning a first part of the group of patterns to relative positions which are greater than the relative nominal or desired position, and assigning a second part of the group of patterns to relative positions which are smaller than the relative nominal or desired position.

In accordance with still an additional mode of the invention, the method of determining the relative position of a first imaging device with respect to a second imaging device further includes, for one absolute value of the relative position, providing that the reference pattern from the first part of the group of reference patterns is identical with the reference pattern from the second part of the group of reference patterns.

In accordance with another mode of the invention, the method of determining the relative position of a first imaging device with respect to a second imaging device further includes, for one absolute value of the relative position, providing that the reference pattern from the first part of the group of reference patterns with respect to the reference pattern from the second part of the group is mirror-symmetrical with respect to an axis perpendicular to the extent of one of the reference patterns.

In accordance with a further mode of the invention, the method of determining the relative position of a first imaging device with respect to a second imaging device further includes arranging the group of mutually different reference patterns on the imaging medium for ordering them in accordance with the associated relative nominal or desired position.

In accordance with an added mode of the invention, the method of determining the relative position of a first imaging device with respect to a second imaging device further includes providing for the imaging medium to be accommodated in a printing unit. The imaging medium, whereon an image has been set by the first and the second imaging device, is printed off onto a printing material before identification of the coincident area coverage. An identification is performed on the printing material, and of the relative position associated with the identified reference pattern from the group of reference patterns.

In accordance with an additional mode of the invention, the method of determining the relative position of a first imaging device with respect to a second imaging device includes setting an image on a first imaging medium assigned to the first imaging device and on a second imaging medium assigned to the second imaging device. An image is set from a group of mutually different reference patterns and a basic pattern by the second imaging device on the second imaging medium assigned to the second imaging device. Each reference pattern of the group of reference patterns is assigned uniquely to one relative position. An image of at least one test pattern is set by the first imaging device on the first imaging medium assigned to the first imaging device. The first and the second imaging media, whereon images have been set by the first and the second imaging devices, are printed off onto a printing material in such a manner that a test pattern, of which an image was set by the first imaging device, is printed off over the basic pattern, for producing a combination pattern. A reference pattern is identified from the group of reference patterns, the area coverage of which coincides with the area coverage of the combination pattern. A relative position associated with the identified reference pattern of the group of reference patterns is identified.

With the objects of the invention in view, there is additionally provided a method of correcting a position of a point of projection of a first imaging device with respect to a point of projection of a second imaging device. The method comprises at least one of changing the relative position and changing a timed triggering of the first imaging device with respect to the second imaging device from an actual position to a nominal or desired position after previously determining the actual position. Area coverages are determined by a measuring device.

With the objects of the invention in view, there is furthermore provided a printing form exposer, comprising first and second imaging devices. A controlled actuator mechanism moves the first and the second imaging devices relative to an imaging medium and/or one another. A control unit includes an electronic unit with a memory unit having a computer program stored therein for correcting the position of the first and the second imaging device by the controlled actuator mechanism and/or a provision for changing timed triggering.

With the objects of the invention in view, there is also provided a printing unit having a first and a second imaging device, comprising a controlled actuator mechanism for moving the first and the second imaging device relative to an imaging medium and/or one another. A control unit includes an electronic unit with a memory unit having a computer program stored therein for correcting the position of the first imaging device by the controlled actuator mechanism and/or a provision for changing timed triggering.

With the objects of the invention in view, there is additionally provided a printing unit group, comprising a first printing unit, to which a first imaging device is assigned, and a second printing unit, to which a second imaging device is assigned. A controlled actuator mechanism moves the first and the second imaging devices relative to imaging media and/or one another. A control unit includes an electronic unit with a memory unit having a computer program stored therein for correcting the position of the first imaging device by the controlled actuator mechanism and/or a provision for changing the timed triggering.

With the objects of the invention in view, there is additionally provided a printing press, comprising a printing unit with a first and a second imaging device. A controlled actuator mechanism moves the first and the second imaging device relative to an imaging medium and/or one another. A control unit includes an electronic unit with a memory unit having a computer program stored therein for correcting the position of the first imaging device by the controlled actuator mechanism and/or a provision for changing timed triggering.

With the objects of the invention in view, there is concomitantly provided a printing press, comprising a printing unit group with a first printing unit, to which a first imaging device is assigned, and with a second printing unit, to which a second imaging device is assigned. A controlled actuator mechanism moves the first and the second imaging devices relative to imaging media and/or one another. A control unit includes an electronic unit with a memory unit having a computer program stored therein for correcting the position of the first imaging device by the controlled actuator mechanism and/or a provision for changing the timed triggering.

According to the invention, a determination of the deviation between the position of the first imaging beam, which is associated with the first imaging device, and the position of the second imaging beam, which is associated with the second imaging device, is performed by a tonal value comparison or area coverage comparison between specific patterns, in particular grid or line patterns, directly on the imaging medium whereon an image is set or on a test image printed with the imaging medium. According to the invention, the relative position of the first imaging device (imaging beam) with respect to a second imaging device (imaging beam) which functions as a so-called master, is determined. By a suitable selection of the orientation or direction of the patterns, in particular line grids, registration of the position deviations or beam tolerances in the fast scanning direction and slow scanning direction is possible, the orientation of the patterns, in particular of the direction of the lines, in the case of line grids, preferably being perpendicular to the direction of the dimensional tolerance, of the position deviation. A precondition for the use of the method according to the invention is precise generation of defined, pixel-accurate patterns, in particular line grids, on the imaging medium.

The method according to the invention of determining the relative position of a first imaging device with respect to a second imaging device by setting images on an associated imaging medium includes at least the following steps: an image is set of a group of mutually different reference patterns and a basic pattern by the second imaging device which serves as a master, each reference pattern of the group being assigned uniquely to one relative position. An image of at least one test pattern is set by the first imaging device, the relative position of which is to be determined, over the basic pattern, so that a combination pattern is produced. A reference pattern, from the group, the area coverage of which coincides with the area coverage of the combination pattern is determined. Because the identified pattern from the group is assigned in a unique way to one relative position, the relative position of the first with respect to the second imaging device is identified.

Expressed in other words, the method according to the invention for determining the relative position of two imaging devices (imaging modules or imaging beams) with respect to one another includes setting images over one another or writing patterns over one another, a number of reference patterns being written by the second imaging device, functioning as a master, and at least one test pattern being written by the first imaging device, the relative position deviation of which is to be determined, so that at least one combination pattern is produced for the purpose of comparing the area coverage or the tonal value by an optical route (measurement) either on the imaging medium or on a test image on a printing material printed by using the imaging medium.

The method according to the invention for determining the relative position of a first imaging device with respect to a second imaging device, the first imaging device being associated with a first imaging medium and the second imaging device being associated with a second imaging medium, includes at least the following steps: an image is set of a group of mutually different reference patterns and a basic pattern by the second imaging device on the second imaging medium associated with the second imaging device, each reference pattern from the group being assigned uniquely to one relative position. An image of at least one test pattern is set by the first imaging device on the first imaging medium associated with the first imaging device. The first and second imaging media whereon images are set by the first and the second imaging device are printed off onto a printing material in such a manner that the test pattern, the image of which is set by the first imaging device, is printed off over the basic pattern, so that a combination pattern is produced. A reference pattern, from the group, the area coverage of which coincides with the area coverage of the combination pattern, is identified. Because the identified pattern from the group is assigned a relative position in a unique manner, the relative position of the first with respect to the second imaging device is identified.

It is particularly advantageous if the reference patterns from the group, the basic pattern and the test pattern are two-dimensional, but are uniform or translation-invariant in one of the two linearly independent directions. Expressed in other words, the patterns can have an orientation or direction. The uniformity, in particular for line patterns or line grids, can particularly advantageously extend perpendicularly to the direction of the relative position deviation to be determined, so that precise detection of the relative position in combination patterns is made possible, because even a small deviation in a direction not parallel to the uniformity can lead to a large change in the area coverage of the combination pattern.

The basic pattern can advantageously include a group of mutually identical control patterns. These can be disposed at various locations on the two-dimensional area of the imaging medium. These control patterns can, but do not have to be, overwritten by one and the same test pattern. In the case of a test pattern, the result is redundancy of the information, so that statistical or other error sources can advantageously be avoided. In the case of a plurality of test patterns, different combination patterns are produced, so that additional information can be obtained by optical comparison. It is also advantageous if the number of reference patterns in the group and the number of control patterns are the same and in each case one reference pattern in the group has just one control pattern uniquely assigned thereto. For example, it is additionally possible for the mutually uniquely associated control and reference patterns also to be disposed adjacently on the two-dimensional surface of the imaging medium. By a unique association or an adjacent configuration, an optical comparison can be carried out simply, quickly and conveniently if the control patterns (basic patterns) are covered by test patterns to form combination patterns. In particular, the comparison can be carried out by a single measurement, a first part of the image field being assigned to the combination pattern and a second part of the image field being assigned to the reference pattern.

A further advantageous feature can be formed by the fact that the number of reference patterns in the group and the associated control patterns in the basic pattern can be uneven. It is then possible for the test pattern to cover a first part of the control patterns with a first sub-pattern, to cover a second part of the control patterns with a second sub-pattern and to cover a control pattern both by the first sub-pattern as well as by the second sub-pattern. As a result, at the location of the first sub-pattern, a first combination pattern is then produced, at the location of the second sub-pattern, a second combination pattern is produced and, at the location of the control pattern covered by the first and second sub-pattern, a third combination pattern is produced. The first and the second sub-pattern can be selected so that the first combination pattern is then exactly identical with the associated control pattern covered thereby when the second combination pattern differs from the associated control pattern covered by the latter, and that the second combination pattern is then exactly identical with the associated control pattern covered thereby when the first combination pattern differs from the associated control pattern covered by the latter. The third combination pattern can coincide either with the first or with the second combination pattern. In this way, it is possible to carry out detection of the sign of the relative position between the first and second imaging device. For these additional features, it can also be true that the reference patterns from the group, the control patterns and the test pattern are two-dimensional, but are uniform or translation-invariant in one of the two linearly independent directions.

It is particularly advantageous if the basic pattern exhibits 50% area coverage, so that relative position deviations lead to small area coverage changes in the patterns starting from 50% area coverage. In this range, area coverage changes can be determined easily and well.

In one advantageous embodiment, the basic pattern and/or the control patterns, if the basic pattern includes a group of control patterns, has a regular sequence of a number of exposed and of the same number of unexposed points in one direction of the extent thereof. In other words, a pattern can be a line grid or a strip grid. The lines can be parallel to one another and in particular can run perpendicularly to the direction wherein the relative position is to be determined.

Furthermore, it is also possible for each of the reference patterns in the group of reference patterns to have a regular sequence of exposed and unexposed points in one direction of the extent thereof, the sequences in one period, respectively, having a first and a second number of exposed points and a third and a fourth number of unexposed points. The directions of the extents of the reference patterns in the group of reference patterns can advantageously also be parallel to one another.

It is particularly advantageous if the number of reference patterns in the group of mutually different reference patterns is uneven and if a reference pattern is assigned to the relative nominal or desired position, a first part of the group of reference patterns is assigned to relative positions which are greater than the relative nominal or desired position, and a second part of the group of reference patterns is assigned to relative positions which are smaller than the relative nominal or desired position. In a first embodiment, for one absolute value of the relative position, the reference pattern from the first part of the group can be identical with the reference pattern from the second part of the group. In a second embodiment, for one absolute value of the relative position, the reference pattern from the first part of the group with respect to the reference pattern from the second part of the group may exhibit mirror symmetry with respect to an axis at right angles to the extent of one of the reference patterns.

In a preferred embodiment of the method according to the invention, the group of mutually different reference patterns can be disposed on the imaging medium so as to be ordered in accordance with the associated relative nominal or desired position. Also optional is the imaging or labeling of the reference patterns by a scale. Expressed in other words, the assignment of a reference pattern to a relative position or position deviation is also directly visible to the human eye. An ordered configuration therefore permits quick and simple optical evaluation of the imaging result.

In an advantageous development of the method according to the invention of determining the relative position of a first imaging device with respect to a second imaging device, if the imaging medium is accommodated in a printing unit for the purpose of imaging, provision is made for the imaging medium whereon an image has been set by the first and second imaging device to be printed off onto a printing material before the identification of coincident area coverage, the identification being performed on the printing material, and the identification of the relative position associated with the identified reference pattern from the group are performed. In addition to the particularly convenient and simple possibility of being able to perform measurements of the area of coverage on the printing material and not on the imaging medium accommodated in the printing unit, this development of the method according to the invention also offers the advantage that, if appropriate, influences of the printing unit on the nominal or desired position or relative nominal or desired position of the two imaging beams or imaging devices can be taken into account, because it is ultimately a question of the relative position of a pixel or printed dot placed by the first imaging device in relation to the position of a pixel or printed dot placed by the second imaging device in the image on the printing material.

The method according to the invention, the advantageous embodiments thereof or the advantageous developments thereof avoid great expenditure of labor and time, because processing of the imaging medium, printing form material, outside the printing form exposer or the printing unit, and examination under a reader or aids, such as magnifying glasses, imaging optics or the like and renewed loading of an imaging medium are no longer necessary, in contrast with the prior state of the art.

The method according to the invention of determining the relative position or the relative position deviation of two imaging devices can be developed further to a method of correcting the position of a first imaging device with respect to a second imaging device, and more accurately, to correcting the position of the points of projection of a first imaging device with respect to points of projection of a second imaging device, by changing the relative position of the first imaging device with respect to the second imaging device from an actual position to a nominal or desired position and/or by changing the timed triggering (of the on and off switching). In this method according to the invention for correcting the position of the points of projection, the area coverages are determined by a measuring device, for example a photodiode or a CCD array, by the intensity of the light reflected from the combination patterns and the reference patterns being detected and the measured values being compared in a suitable processing unit. As a result, the identification of combination patterns and reference patterns is made possible in electronic form, so that a signal for changing the relative position of the first imaging device with respect to the second imaging device and, consequently, also for changing the relative position of the associated points of projection can be generated. On the one hand, this signal can be in the form of a display for a human being, on the other hand, provision can also be made for the relative position to be changed from an actual position to a nominal or desired position by an actuator mechanism. As an alternative thereto, the timed triggering of the first imaging device relative to the second imaging device can take place later or earlier than in the uncorrected state.

The method according to the invention for correcting the position of the points of projection can be implemented in the following manner in a device: a printing form exposer having at least a first and a second imaging device, which can be moved relative to the imaging medium and/or to one another by a controlled actuator mechanism, has a control unit. The printing form exposer is distinguished by the fact that the control unit includes an electronic unit with a memory unit, wherein a computer program for correcting the position of the first imaging device by the controlled actuator mechanism and/or by changed timed triggering is stored, the computer program having at least one functional section wherein steps from the method according to the invention for correcting the position by the actuator mechanism and/or the timed triggering are performed.

As an alternative thereto, an implementation can also be performed for a printing unit or a printing unit group: a printing unit having a first and a second imaging device or a printing unit group having a first printing unit, to which a first imaging device is assigned, and having a second printing unit, to which a second imaging device is assigned, the imaging devices, which are movable relative to the imaging medium and to the imaging media and to one another, respectively, by a controlled actuator mechanism, having a control unit. The printing unit and the printing unit group, respectively, are distinguished by the fact that the control unit includes an electronic unit with a memory unit, wherein a computer program for correcting the position of the first imaging device by the controlled actuator mechanism and/or changing the timed triggering is stored, the computer program having at least one functional section wherein steps from the method according to the invention for correcting the position by the actuator mechanism and/or changing the timed triggering are performed. A printing press according to the invention, whether it is a web-fed or a sheet-fed printing press, in particular a planographic printing press, an offset printing press or the like, has at least one printing unit according to the invention and/or at least one printing unit group according to the invention.

Other features which are considered as characteristic for the invention are set forth in the appended claims.

Although the invention is illustrated and described herein as embodied in a method for determining the relative position of first and second imaging devices, a method of correcting a position of a point of projection of the devices, a printing form exposer, a printing unit, a printing unit group and a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2A and 2B are diagrams of an advantageous embodiment of the pattern which has been utilized and the configuration thereof for the method according to the invention;

DESCRIPTION OF THE PREFERRED EMBODIMENTS

Figure 1C:
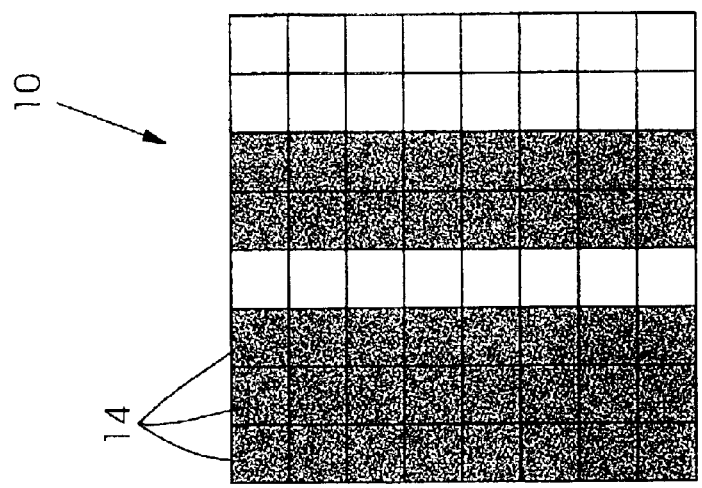
FIGS. 1A to 1C are diagrammatic representations of the construction of a pattern as can be utilized in the method according to the invention.
Figure 1B:
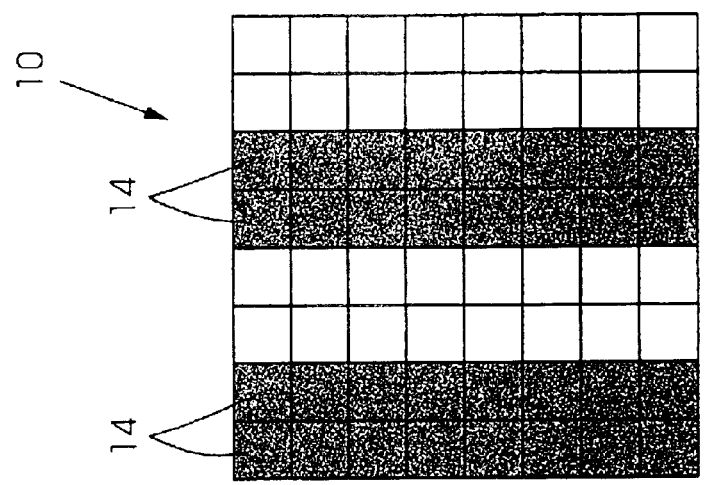
Figure 1A:
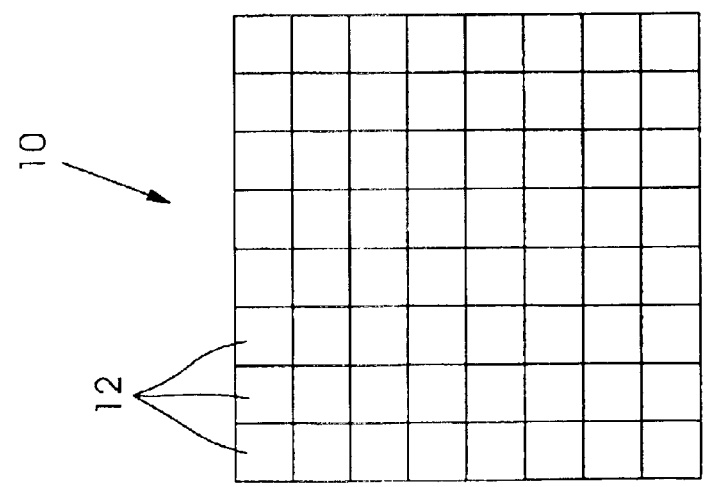

Referring now to the figures of the drawings in detail and first, particularly, to FIG. 1 thereof, there is seen a diagram which serves for explaining the construction of a pattern that may be utilized in the method according to the invention. A pattern 10 is made up of a number of pattern units 12. The pattern units 12 correspond to pixels or printed dots, or expressed otherwise, a pattern unit 12 is an imaging point that is produced on the imaging medium at least by one imaging beam and one imaging device, respectively. Mutually adjacent pattern units 12 have a spacing therebetween corresponding to the spacing between imaging points. In one advantageous embodiment of the method according to the invention, patterns 10 are utilized which are constructed by pattern units 12 lying on a regular and rectangular grid. By way of example, in the sequence of partial images illustrated in FIGS. 1A, 1B and 1C, patterns 10 are shown which are constructed in square form from eight by eight pattern units 12. Patterns 10 can also have a considerably larger number of pattern units 12 which, in the preferred embodiment shown in FIGS. 2A and 2B, 3A and 3B, and 4A and 4B, are 112 by 112 pattern units 12. In FIG. 1A, in order to simplify the representation, the pattern 10 is shown built up from square pattern units 12 having surface centers of gravity lying on a rectangular grid. In the case of the method according to the invention, the pattern units 12 can be present in two states: a non-imaged and an imaged state. The imaged state can be achieved either by setting an image with a first imaging device or by setting an image with a second imaging device. In FIG. 1B, the first, second, fifth and sixth columns from the left-hand side of the pattern 10 are shown as having had an image set by the second imaging unit. The pattern 10 then has imaged pattern units 14. Further setting of an image of a previously imaged pattern unit 14 leads to no qualitative state change in the sense of the method according to the invention. Expressed in other words, a pattern unit 14 already imaged by the second imaging device does not change qualitatively, i.e., remains imaged as a result of renewed imaging by the first imaging device. It is assumed that the first imaging device sets the image in the second and the third column from the left-hand side of the pattern 10. FIG. 1C then shows that the imaged pattern units 14 in the second column, which had already been imaged, have not experienced any qualitative change, while the pattern units 12 in the third column have now become imaged pattern units 14. Expressed in other words, FIG. 1B shows an example of a basic pattern or a control pattern, which becomes the combination pattern shown in FIG. 1C due to overwriting in the second and third columns of the pattern 10.

If the first and the second imaging devices have a relative nominal or desired position with respect to one another, then when the surface of the imaging medium is scanned in the method according to the invention, assurance is provided that the pattern units 14 written or illustrated by the first imaging device cover at least one subset of the pattern units 14 illustrated or written by the second imaging device (or master). Expressed in other words, combination pattern and basic pattern coincide; no manipulation or handling is required. On the other hand, if the first and the second imaging devices have an actual position relative to one another which differs from the nominal or desired position, then when the surface of the imaging medium is scanned in the method according to the invention, at least one pattern unit 14 is then written by the first imaging device which does not cover a pattern unit 14 written by the second imaging device (or master). Expressed in other words, combination pattern and basic pattern do not coincide; manipulation or handling is required.

FIGS. 2A and 2B show an advantageous embodiment of the patterns used and the configuration thereof for the method according to the invention. FIG. 2B is an enlargement of a portion of FIG. 2A. In this advantageous embodiment, as illustrated in FIG. 2A, the method according to the invention is based upon fifteen reference patterns 16 and fifteen control patterns (basic patterns 18). In the method according to the invention, images of reference patterns 16 and basic patterns 18 are set by the second imaging device, the master. Each reference pattern 16 is assigned a control pattern 18, so that fifteen blocks exist. A scale 20 is provided, of which an image is likewise set, the scale 20 labeling the fifteen blocks and visualizing the unique assignment of each reference pattern 16 to a relative position. This procedure is advantageous in particular for the measurement or checking of a printing material pulled off from the imaging medium. In this embodiment, the patterns have 112 by 112 pattern units 12. As viewed from area center of gravity to area center of gravity, adjacent pattern units 12 have a spacing of 10 μm. The patterns correspond to a grid of 60 lines per centimeter with addressing of 1000 lines per centimeter.

In this embodiment, the reference patterns 16 differ from one another so that, as a result of the area coverage of the combination patterns produced by overwriting the control patterns (basic patterns 18) by a test pattern, spacing changes of 5 μm can be made visible or measurable. The blocks include reference patterns 16 and basic patterns 18 formed by line grids, which are uniform in a direction perpendicular to the direction wherein the relative position is to be determined. The line grid for the basic pattern 18, i.e., all the control patterns, is constructed regularly: it has columns of imaged and non-imaged pattern units 12. FIG. 2A shows that, as viewed from the lefthand to the righthand side thereof, alternately eight columns have an image set and eight columns have no image set. The basic pattern therefore exhibits 50% area coverage.

The reference patterns 16 are to be classified here into a first, upper part and a second, lower part, and a central reference pattern for the nominal or desired position 22. The central reference pattern for the nominal position 22, as viewed from the lefthand to the righthand side, has alternately eight columns with an image set and eight columns with no image set, i.e., like the basic pattern 18, exhibits an area coverage of 50%. This central reference pattern 22 is assigned to the relative position 0 μm, more accurately a deviation 0 μm from the relative nominal position, as can also be seen from the scale 20. In the first, upper part here, reference patterns 16 are disposed in an ordered fashion, are assigned the relative positions −5.0 μm, −10.0 μm, −15.0 μm, −20.0 μm, −25.0 μm, −30.0 μm and −35.0 μm, and are reproduced in the scale 20. From adjacent reference pattern to reference pattern, the area coverage (tonal value) increases in steps of 3.125% as far as 71.875% for −35.0 μm. This increase in area coverage is achieved as follows.

Considering the reference pattern 16 for a specific relative position, the reference pattern 16 for the relative position of the next step, i.e., the specific relative position minus 5.0 μm, then differs by the fact that a further column of pattern units 12 also has an image set by the second imaging device. The arranged sequence, starting from the central reference pattern 16 with 50% area coverage, is formed as follows in the advantageous embodiment shown in FIGS. 2A and 2B by the variation in a 4-column periodicity: for 0 μm, eight with an image set, eight with no image set, eight with an image set, eight with no image set; for −5.0 μm, eight with an image set, eight with no image set, nine with an image set, seven with no image set; −10.0 μm, nine with an image set, seven with no image set, nine with an image set, seven with no image set; −15.0 μm, nine with an image set, seven with no image set, ten with an image set, six with no image set; −20.0 μm, ten with an image set, six with no image set, ten with an image set, six with no image set; −25.0 μm, ten with an image set, six with no image set, eleven with an image set, five with no image set; −30.0 μm, eleven with an image set, five with no image set, eleven with an image set, five with no image set; and −35.0 μm, eleven with an image set, five with no image set, twelve with an image set, four with no image set. Due to the four-column periodicity, wherein only a proportion of the area coverage of the reference patterns 16 is changed 3.125% from one relative position to the next relative position, it is possible to make a relative position deviation which is finer or smaller than the spacing of the pattern units 12 that is detectable, in particular here, half of the spacing of adjacent pattern units 12; the measured variable is the integral area coverage of the combination pattern, which is compared with the integral area coverage of the reference patterns 16.

The reference patterns in the second, lower part here are disposed in order and are assigned to the relative positions 5.0 μm, 10.0 μm, 15.0 μm, 20.0 μm, 25.0 μm, 30.0 μm and 35.0 μm, as are also reproduced in the scale 20. In this advantageous embodiment, the two reference patterns 16 to which two relative positions are assigned which have a mutually coinciding equal absolute value and follow the four-column periodicity listed in more detail above for the first part.

With knowledge of the method according to the invention, it is clear to those skilled in the art that an increase in the sensitivity and a reduction in the size of the step width, respectively, of relative positions can be achieved by increasing the grid frequency of the lines in the group of the reference patterns 16 and the control patterns 18 (basic patterns) or, expressed in other words, the spacing of the pattern units 12: for example, therefore, four strips exposed and four strips unexposed. The patterns then correspond to a grid of 120 lines per centimeter for an addressing of 1000 lines per centimeter. Furthermore, it is clear that, in the method according to the invention, a refinement in the step width of relative positions with a specific spacing of the pattern units 12 can be achieved by a different number of strips in the periodicity of the strip sequence; for example, by a six-strip periodicity of the reference patterns 16 which, in a manner analogous to that described hereinabove for the four-strip periodicity, respectively, in permutation, broadens the exposed strips, an ordered sequence of reference patterns 16 can be produced, which make it possible to visualize and make measurable, respectively, relative position deviations of one third of the spacing of adjacent pattern units 12. For 2n-strip periodicities broadened in permutation, it is generally true that 1/n of the spacing of adjacent pattern units becomes measurable, n being a natural number greater than or equal to two.

Considering FIGS. 3A and 3B and FIGS. 4A and 4B, an explanation is provided as to how, by covering the control patterns (basic patterns) with a test pattern, by which combination patterns are produced, relative positions of the first imaging device with respect to the second imaging device become measurable: for different relative positions between the two imaging devices, different combination patterns are produced, the area coverage of which is determined (measured) and compared with the area coverage of the reference patterns.

In this advantageous embodiment, the test pattern has the following characteristic or property: the seven control patterns which are assigned to the reference patterns 16 of the first, upper part are overwritten by a test pattern of 112 by 112 pattern units by the first imaging device, which has a two-strip periodicity having four exposed and twelve unexposed columns. The central control pattern which is assigned to the reference pattern for the nominal or desired position is overwritten by a test pattern of 112 by 112 pattern units having a two-strip periodicity of eight exposed and eight unexposed columns. The seven control patterns which are assigned to the reference patterns 16 of the second, lower part, are overwritten by a test pattern of 112 by 112 pattern units by the first imaging device, which has a periodicity with four unexposed, four exposed and eight unexposed columns, and thus has a two-strip periodicity which is offset by four columns as compared with the test pattern over the first, upper part.

The test pattern is written by the first imaging devices in such a way that the pixels (pattern units) are driven as though the relative position of the first with respect to the second imaging devices were the nominal or desired position. Expressed in other words, if the relative actual position, i.e., the actual spacing between the two imaging devices, is the relative nominal or desired position, i.e., the nominal or desired spacing, then an image of a specific or given pattern element of the test pattern (specific or given column, specific or given row) is set at a time at which the projection of the imaging beam of the first imaging device comes to lie at that coordinate point on the surface of the imaging medium at which the setting of an image of the pattern unit of the control pattern (basic pattern) has been carried out at a different, preceding time in the same specific or given column and the same specific or given row. The control patterns are thus located in a region of the surface of the imaging medium which can be swept over both by the first as well as by the second imaging device and the projections of the imaging beams thereof, respectively, so that test patterns can be written over the control patterns to produce combination patterns. As those skilled in the art can readily imagine, on the one hand, for the case of synchronous movement of the two imaging devices, if there is a fixed spacing, this overlapping region is reached by the first imaging device when the latter comes at a later time into a region which has previously been written by the second imaging device, or on the other hand, an overlapping region can be defined by overlapping amplitudes of the individual movements of the imaging devices for the case of mutually independent movements of the two imaging devices, i.e., a variable spacing when there is a suitable actuator mechanism during the imaging.

Figures 3A, 3B:
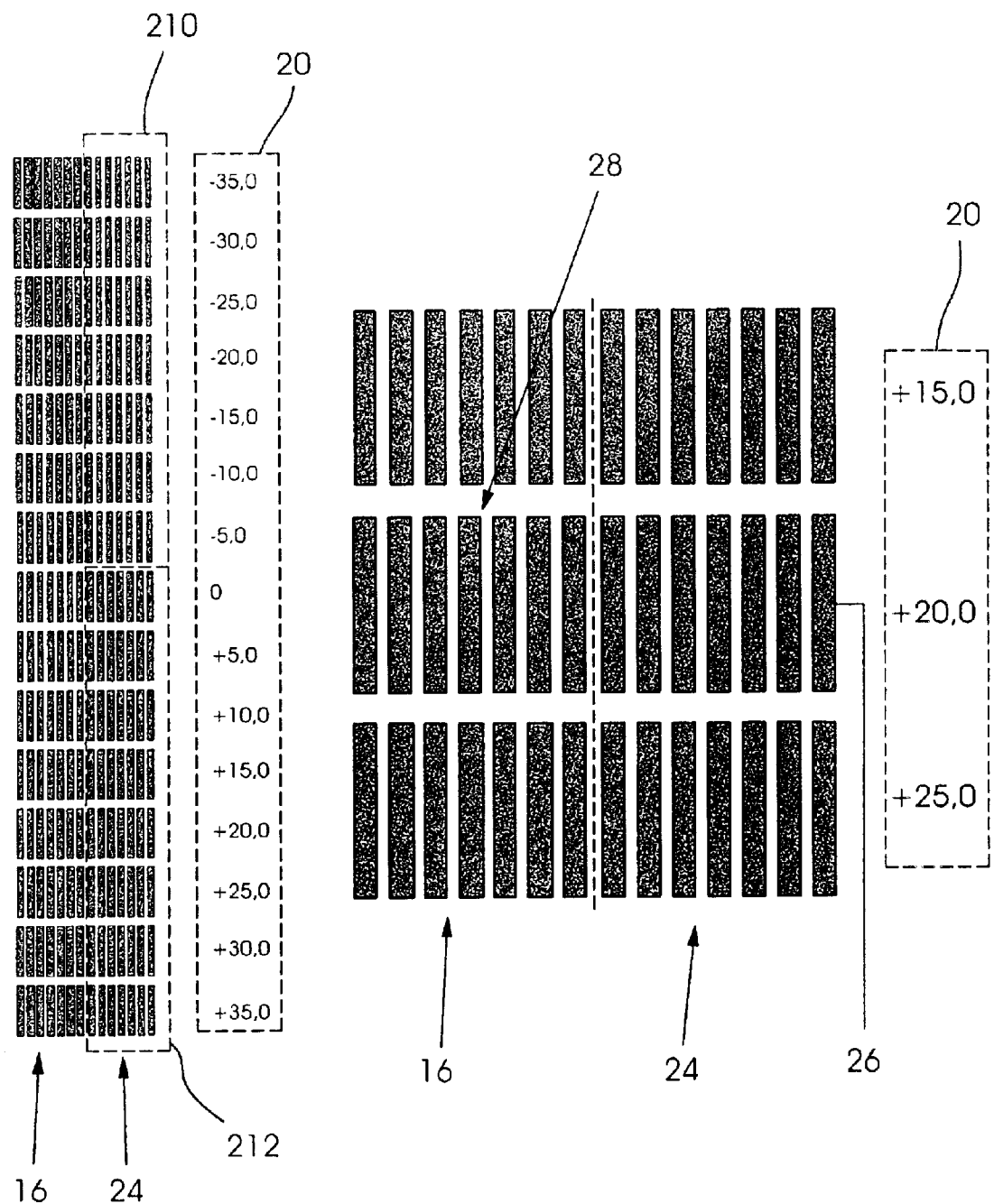
FIGS. 3A and 3B are diagrams of combination patterns shown above one another for a first position of the first imaging device relative to the second imaging device on arranged patterns and reference patterns of the advantageous embodiment according to FIGS. 2A and 2B.

FIGS. 3A and 3B are related diagrammatically to combination patterns written over one another for a first relative position, differing from the nominal or desired position, of the first imaging device with respect to the second imaging device on arranged patterns and reference patterns of the advantageous embodiment according to FIGS. 2A and 2B. FIG. 3B is an enlarged detail of FIG. 3A. In FIG. 3A, the fifteen reference patterns 16 and the scale 20 which have already appeared in FIG. 2A are shown. The fifteen control patterns (basic patterns) 18 from FIG. 2A have now been covered by the test pattern, as described in greater detail hereinabove, which has been written by the first imaging device, the relative position of which with respect to the second imaging device (master) is to be determined, so that fifteen combination patterns 24 have been produced. Fifteen blocks thus exist, respectively having a reference pattern 16 and a combination pattern 24 for an associated relative position. Because, in this example of FIGS. 3A and 3B, the first relative position of the imaging devices with respect to one another differs from the relative nominal or desired position, when the first imaging device is driven to write the pixels (pattern units) as though the relative position of the first imaging device with respect to the second imaging device were the nominal or desired position, the test pattern is offset with respect to the position of the control patterns (basic patterns) 18 on the imaging medium by the first relative position (deviation of the first position from the intended position).

In the example of FIGS. 3A and 3B, the results for the first position are the following combination patterns 24: a first subset of the combination patterns 210 remains unchanged, because the first imaging device has set an image only of pattern units of which an image has already been set by the second imaging device. As illustrated in FIGS. 1A to 1C, the result is no qualitative change in the pattern units as a result of renewed imaging. A second subset of the combination patterns 212, on the other hand, now has a changed two-strip periodicity: ten exposed and six unexposed strips. In FIG. 3B, an enlargement of a detail of FIG. 3A of the blocks of reference pattern 16 and combination pattern 24 for the relative positions 15.0 $\mu$m, 20.0 $\mu$m and 25.0 $\mu$m, in addition to the scale 20, is shown. By optical determination and measurement, respectively, of the area coverage, it is shown that the area coverage of a first identified combination pattern 26 agrees with the area coverage of a reference pattern 28 (ten exposed, six unexposed, ten exposed, six unexposed), so that it can be concluded and a signal can be generated within an electronic or information-technical processing unit, respectively, that the reference pattern 28 corresponds to the first identified combination pattern 26. An identification of the reference pattern 28 has taken place and, based upon the unique assignment to the relative position (deviation), the latter is determined. In the example of FIGS. 3A and 3B, this is the relative position 20.0 $\mu$m. By the specified or given method, for example in this advantageous embodiment, both the magnitude as well as the direction of the deviation are determinable.

Figures 4A, 4B:
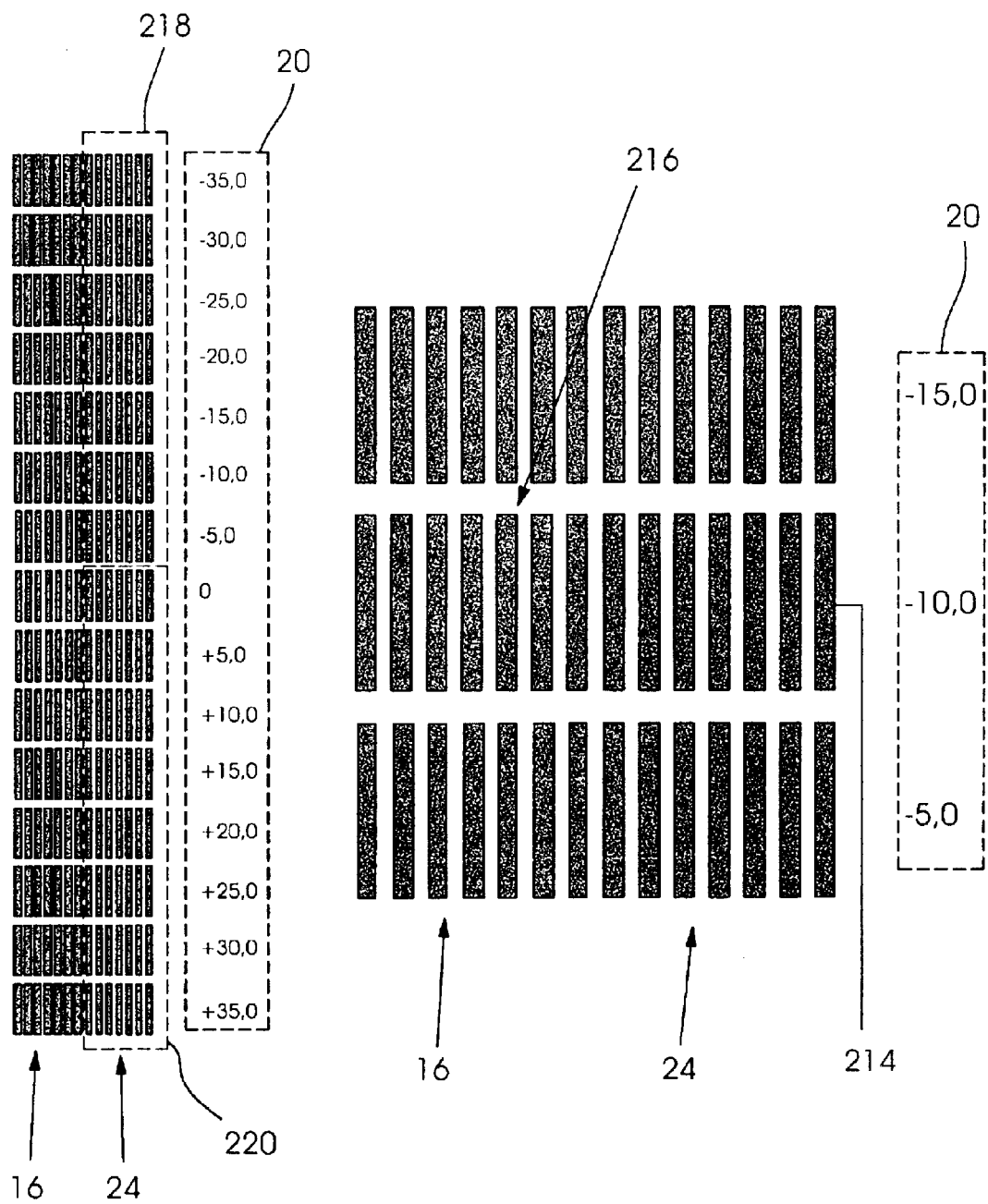
FIGS. 4A and 4B are diagrams of combination patterns shown above one another for a second position of the first imaging device relative to the second imaging device on arranged patterns and reference patterns of the advantageous embodiment according to FIGS. 2A and 2B.

FIGS. 4A and 4B illustrate combination patterns written schematically above one another for a second relative position, deviating from the nominal or desired position, of the first imaging device with respect to the second imaging device on arranged patterns and reference patterns of the advantageous embodiment according to FIGS. 2A and 2B. FIG. 4B is an enlarged detail of FIG. 4A. In FIG. 4A, the fifteen reference patterns 16 and the scale 20 which have already appeared in FIG. 2A are shown. The fifteen control patterns (basic patterns) 18 from FIG. 2A have now been covered by the test pattern, as described in greater detail hereinabove, which has been written by the first imaging device, the relative position of which with respect to the second imaging device (master) is to be determined, so that fifteen combination patterns 24, which differ from those for the first position according to FIG. 3A, have been produced. Because, in this example of FIGS. 4A and 4B, the second relative position of the imaging devices with respect to one another differs from the relative nominal or desired intended position, if the first imaging device is driven to write the pixels (pattern units) as though the relative position of the first imaging device with respect to the second imaging device were the nominal or desired position, the test pattern is offset with respect to the position of the control patterns (basic patterns) 18 on the imaging medium by the first relative position (deviation of the first position from the nominal or desired position).

In the example of FIGS. 4A and 4B, the following combination patterns 24 result for the second position: a third subset of the combination patterns 218 now has a changed two-strip periodicity: nine exposed and seven unexposed strips. A fourth subset of the combination patterns 220, on the other hand, remains unchanged, because the first imaging device sets images only of pattern units of which images have already been set by the second imaging device. As illustrated in FIGS. 1A to 1C, the result is no qualitative change in the pattern units due to renewed imaging. In FIG. 4B, an enlargement of a detail of the blocks of reference pattern 16 and combination pattern 24 of FIG. 4A is now shown for the relative positions −15.0 µm, −10.0 µm and −5.0 µm, together with the scale 20. By optical determination and measurement, respectively, of the area coverage, it is shown that the area coverage of a second identified combination pattern 214 coincides with the area coverage of a reference pattern 216 (nine exposed, seven unexposed, nine exposed, seven unexposed), so that it can be concluded and a signal can be generated within an electronic or information-technical processing unit, respectively, that the reference pattern 216 corresponds to the second identified combination pattern 214. An identification of the reference pattern 216 has taken place and, based upon the unique assignment to the relative position (deviation), the latter is determined. In the example of FIGS. 4A and 4B, this is the relative position −10.0 µm. By the method specified or given, for example in this advantageous embodiment, both the magnitude and the direction of the deviation are determinable, in this case of FIGS. 4A and 4B, in contrast with that of FIGS. 3A and 3B.

Figure 5:
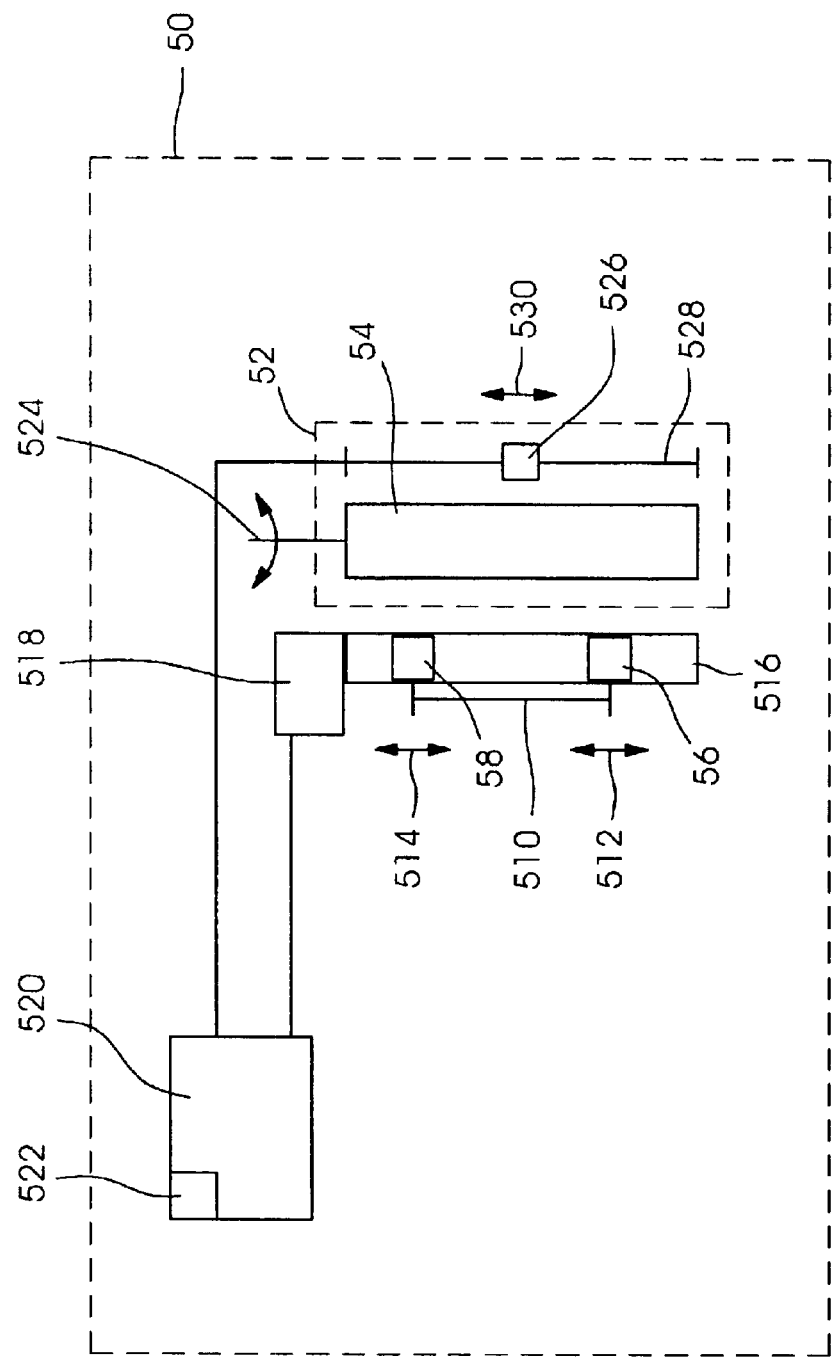
FIG. 5 is a diagrammatic, plan view of a printing press with an embodiment of a printing unit according to the invention having a first and a second imaging device, the relative positions of which are determined and corrected by the method according to the invention.

FIG. 5 is a diagrammatic plan view of a printing press having an embodiment of a printing unit according to the invention with a first and a second imaging device, the relative position of which is determined and corrected by the method according to the invention. Provided within a printing press 50 is a printing unit 52, wherein an imaging medium 54 can be written on or have an image set thereon (direct imaging printing unit or on-press imaging). A first imaging device 56 and a second imaging device 58 are assigned to the imaging medium 54 and have a relative position 510 with respect to one another. A translation 514 of the first imaging device 56 and a translation 512 of the second imaging device 58 are in each case symbolized by a double arrow. Expressed in other words, the first and the second imaging devices 56 and 58, respectively, are movable both relative to the surface of the imaging medium and also with respect to one another in this embodiment. In order to produce these movements, the printing unit 52 according to the invention includes a linear drive 516 with a suitable actuator mechanism 518 for the respective first and second imaging devices 56 and 58. The actuator mechanism 518 is linked to a control unit 520. The control unit 520 has a memory unit 522. A computer program which is stored in the memory unit 522 has at least one section wherein method steps relating to the position correction, which includes the steps of the method according to the invention for determining the relative position of the first imaging device 56 with respect to the second imaging device 58, are executed. As an alternative to a computer program in a memory unit 522, it is also possible to provide an electronic circuit which can perform the same logical operations.

The imaging medium 54 is rotatable about an axis of rotation 524, for which purpose a suitable non-illustrated drive is provided. As a result of the rotation about the axis of rotation 524 and the translations 512 and 514 at least approximately parallel to the axis of rotation 524, all the coordinate points at which images are to be set on the surface of the imaging medium 54 can be reached by at least one of the two imaging devices 56 and 58. With the aid of a measuring device 526, which is translated along the travel path 528 by a non-illustrated conventional drive represented here by the double arrow 530, the area coverages of various patterns written by the imaging devices, for example directly on the imaging medium or on a printing material onto which the written image has been printed off in the printing unit 52, can be determined. The measuring device 526 is linked to the control unit 520, so that the information obtained regarding the relative actual position can be processed for the position correction, whether via the controlled actuator mechanism, via a change in the timed triggering or via both of these measures.

We claim:

1. A method of determining a relative position of first and second imaging devices, which comprises:

setting an image of a group of mutually different reference patterns and a basic pattern on an imaging medium with the second imaging device, each reference pattern of the group being assigned uniquely to one relative position;

setting an image of at least one test pattern over the basic pattern with the first imaging device, for forming a combination pattern with an area coverage;

identifying a reference pattern from the group of reference patterns, the identified reference pattern having an area coverage coinciding with the area coverage of the combination pattern; and identifying a relative position associated with the identified reference pattern of the group of reference patterns.

2. The method of determining the relative position of first and second imaging devices according to claim 1, which further comprises:

configuring the reference patterns of the group, the basic pattern and the test pattern to be two-dimensional and uniform in one of two linearly independent directions.

3. The method of determining the relative position of first and second imaging devices according to claim 1, which further comprises:

forming the basic pattern of a group of mutually identical control patterns.

4. The method of determining the relative position of first and second imaging devices according to claim 3, which further comprises:

providing the same number of reference patterns in the group and control patterns; and assigning a respective control pattern uniquely to a respective reference pattern in the group of reference patterns.

5. The method of determining the relative position of first and second imaging devices according to claim 4, which further comprises arranging the mutually associated reference patterns in the group and control patterns adjacently on a surface of the imaging medium.

6. The method of determining the relative position of first and second imaging devices according to claim 5, which further comprises:

providing an uneven number of the reference patterns in the group; and using the test pattern to cover a first part of the control patterns with a first sub-pattern, and a second part of the control patterns with a second sub-pattern, both the first sub-pattern and the second sub-pattern covering a control pattern.

7. The method of determining the relative position of first and second imaging devices according to claim 3, which further comprises configuring the reference patterns from the group, the control patterns and the test pattern to be two-dimensional and uniform in one of two linearly independent directions.

8. The method of determining the relative position of first and second imaging devices according to claim 1, which further comprises providing the basic pattern with 50% area coverage.

9. The method of determining the relative position of first and second imaging devices according to claim 1, which further comprises providing the basic pattern with a regular sequence of a plurality of exposed points and a like number of unexposed points in one direction of extent thereof.

10. The method of determining the relative position of first and second imaging devices according to claim 1, which further comprises providing each of the reference patterns in the group of reference patterns with a regular sequence of exposed and unexposed points in one direction of extent thereof, the sequences in one period respectively having a first and a second number of exposed points and a third and a fourth number of unexposed points.

11. The method of determining the relative position of first and second imaging devices according to claim 10, which further comprises providing the reference patterns in the group of reference patterns with mutually parallel directions of extent.

12. The method of determining the relative position of first and second imaging devices according to claim 1, which further comprises:

providing an uneven number of the reference patterns in the group of mutually different reference patterns; and assigning a reference pattern to a relative nominal or desired position, assigning a first part of the group of patterns to relative positions greater than the relative nominal or desired position, and assigning a second part of the group of patterns to relative positions smaller than the relative nominal or desired position.

13. The method of determining the relative position of first and second imaging devices according to claim 12, which further comprises:

configuring the reference pattern from the first part of the group of reference patterns to be identical with the reference pattern from the second part of the group of reference patterns, for one absolute value of the relative position.

14. The method of determining the relative position of first and second imaging devices according to claim 12, which further comprises:

configuring the reference pattern from the first part of the group of reference patterns with respect to the reference pattern from the second part of the group to be mirror-symmetrical with respect to an axis perpendicular to an extent of one of the reference patterns, for one absolute value of the relative position.

15. The method of determining the relative position of first and second imaging devices according to claim 1, which further comprises arranging the group of mutually different reference patterns on the imaging medium for ordering in accordance with an associated relative nominal or desired position.

16. The method of determining the relative position of first and second imaging devices according to claim 1, which further comprises:

accommodating the imaging medium in a printing unit;

printing-off the imaging medium, having an image set by the first and second imaging devices, onto a printing material before the identification of the coincident area coverage; and carrying out the identification on the printing material and of the relative position associated with the identified reference pattern from the group of reference patterns.

17. A method of determining a relative position of first and second imaging devices, which comprises:

setting an image on a first imaging medium assigned to the first imaging device and on a second imaging medium assigned to the second imaging device;

setting an image from a group of mutually different reference patterns and a basic pattern with the second imaging device on the second imaging medium assigned to the second imaging device, each reference pattern of the group of reference patterns being assigned uniquely to one relative position;

setting an image of at least one test pattern with the first imaging device on the first imaging medium assigned to the first imaging device;

printing-off the first and second imaging media, having images set by the first and second imaging devices, onto a printing material for printing-off a test pattern; having an image set by the first imaging device, over the basic pattern, for producing a combination pattern with an area coverage;

identifying a reference pattern from the group of reference patterns, the identified reference pattern having an area coverage coinciding with the area coverage of the combination pattern; and identifying a relative position associated with the identified reference pattern of the group of reference patterns.

18. A method of correcting a position of a point of projection of a first imaging device with respect to a point of projection of a second imaging device, the method which comprises:

at least one of changing the relative position and changing a timed triggering of the first imaging device with respect to the second imaging device from an actual position to a nominal or desired position after previously determining the actual position; and determining area coverages with a measuring device.

19. A printing form exposer, comprising:

first and second imaging devices;

a controlled actuator mechanism for moving said first and second imaging devices relative at least to one of an imaging medium and one another; and a control unit including an electronic unit having a memory unit with a computer program stored therein for correcting a position of said first and second imaging devices by at least one of said controlled actuator mechanism and a changing timed triggering, said computer program having at least one functional section performing steps of the method of claim 18.

20. A printing unit, comprising:

first and second imaging devices;

a controlled actuator mechanism for moving said first and second imaging devices relative to at least one of an imaging medium and one another; and a control unit including an electronic unit having a memory unit with a computer program stored therein for correcting a position of said first imaging device by at least one of said controlled actuator mechanism and a changing timed triggering, said computer program having at least one functional section performing steps of the method of claim 18.

21. A printing unit group, comprising:

first and second printing units;

a first imaging device assigned to said first printing unit and a second imaging device assigned to said second printing unit;

a controlled actuator mechanism for moving said first and second imaging devices relative to at least one of imaging media and one another; and a control unit including an electronic unit having a memory unit with a computer program stored therein for correcting a position of said first imaging device by at least one of said controlled actuator mechanism and a changing timed triggering, said computer program having at least one functional section performing steps of the method of claim 18.

22. A printing press, comprising:

a printing unit with first and second imaging devices;

a controlled actuator mechanism for moving said first and second imaging devices relative to at least one of an imaging medium and one another; and a control unit including an electronic unit having a memory unit with a computer program stored therein for correcting a position of said first imaging device by at least one of said controlled actuator mechanism and a changing timed triggering, said computer program having at least one functional section performing steps of the method of claim 18.

23. A printing press, comprising:

a printing unit group having first and second printing units;

a first imaging device assigned to said first printing unit and a second imaging device assigned to said second printing unit;

a controlled actuator mechanism for moving said first and second imaging devices relative to at least one of imaging media and one another; and a control unit including an electronic unit having a memory unit with a computer program stored therein for correcting a position of said first imaging device by at least one of said controlled actuator mechanism and a changing timed triggering, said computer program having at least one functional section performing steps if the method of claim 18.

* * * * *